Sept. 23, 1952 — H. C. SNOW ET AL — 2,611,216
METHOD OF AND MACHINE FOR MAKING CIRCULAR FLUORESCENT LAMPS
Filed March 25, 1949 — 8 Sheets-Sheet 3
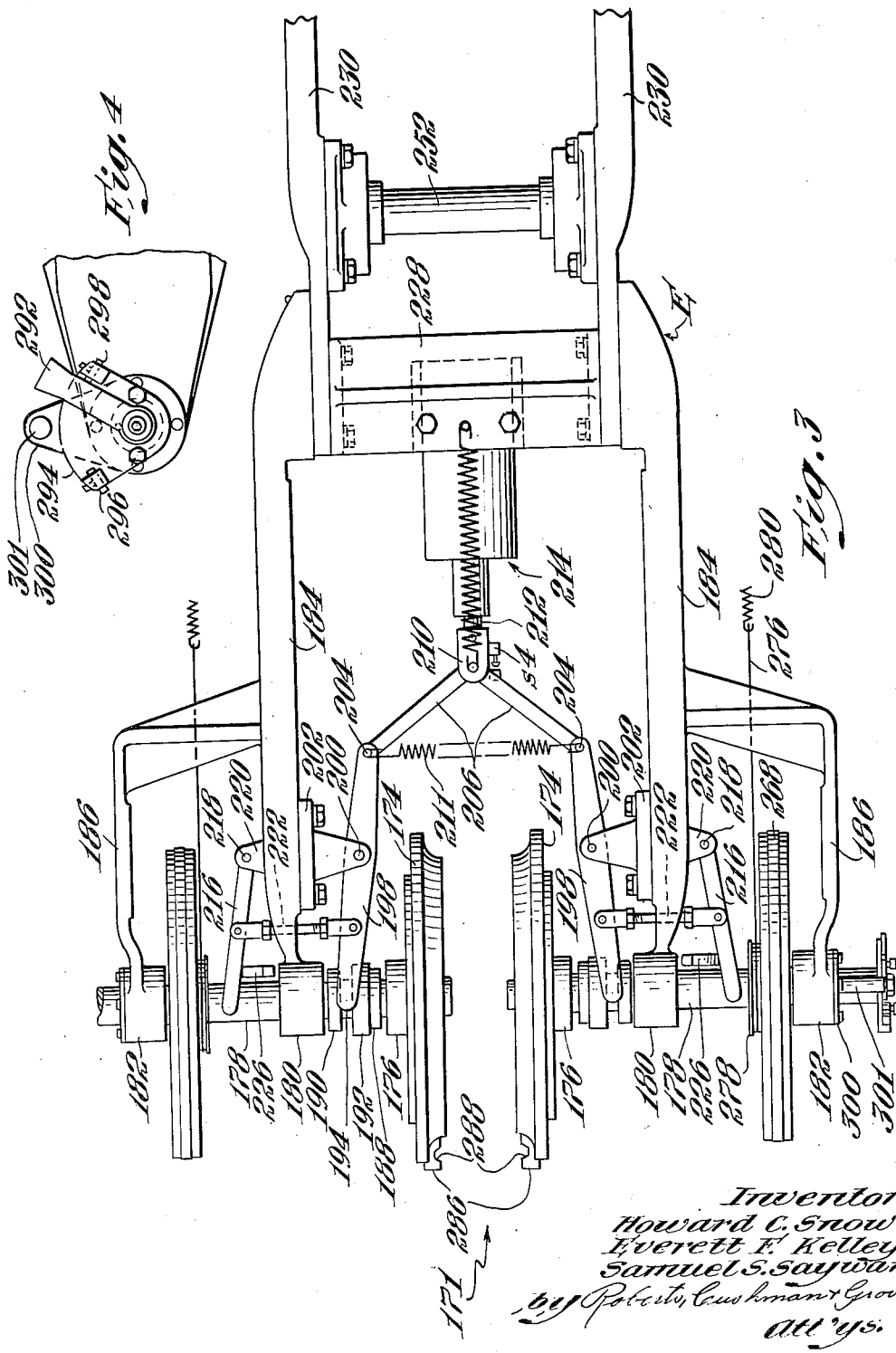
Inventors
Howard C. Snow
Everett F. Kelley
Samuel S. Sayward
by Roberts, Cushman & Grover
Att'ys.

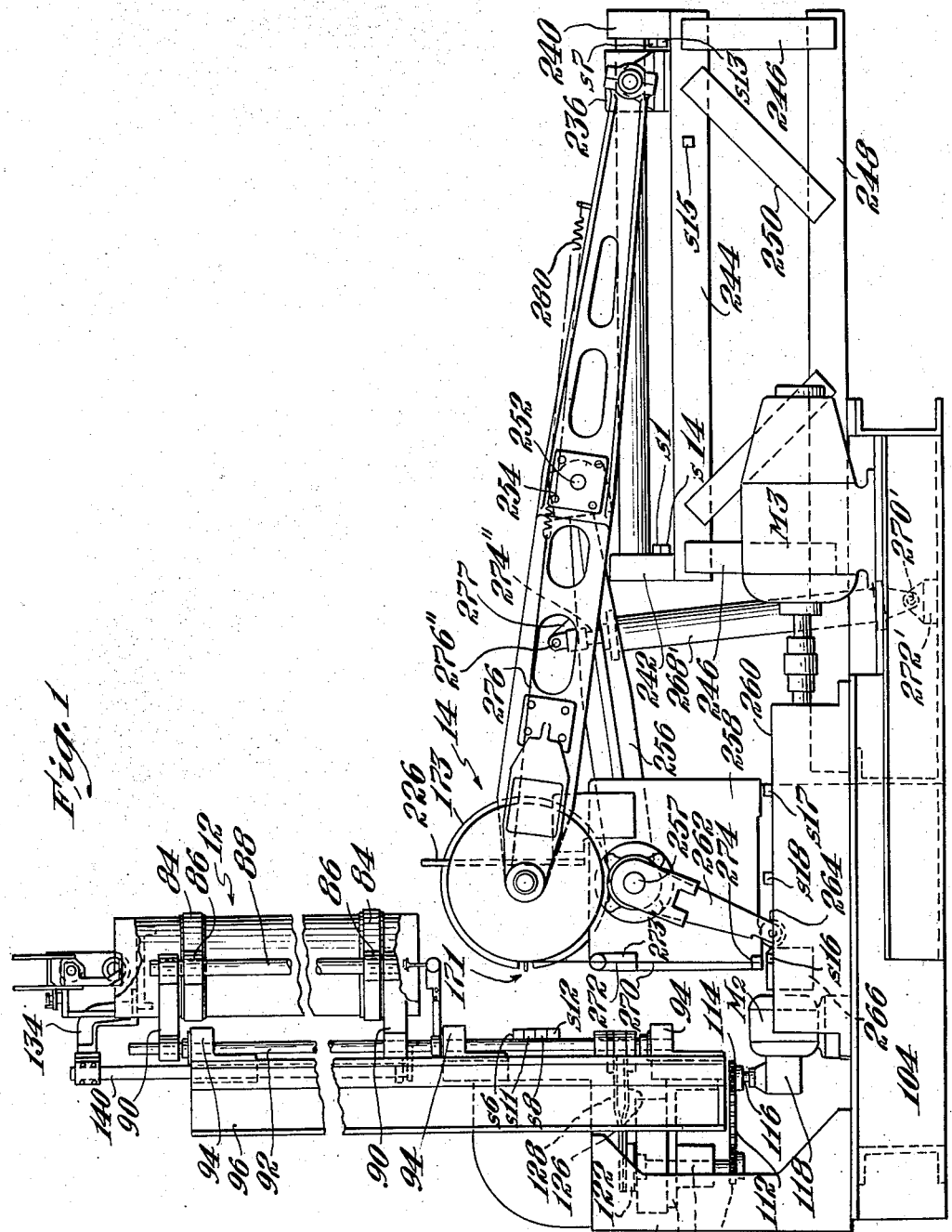

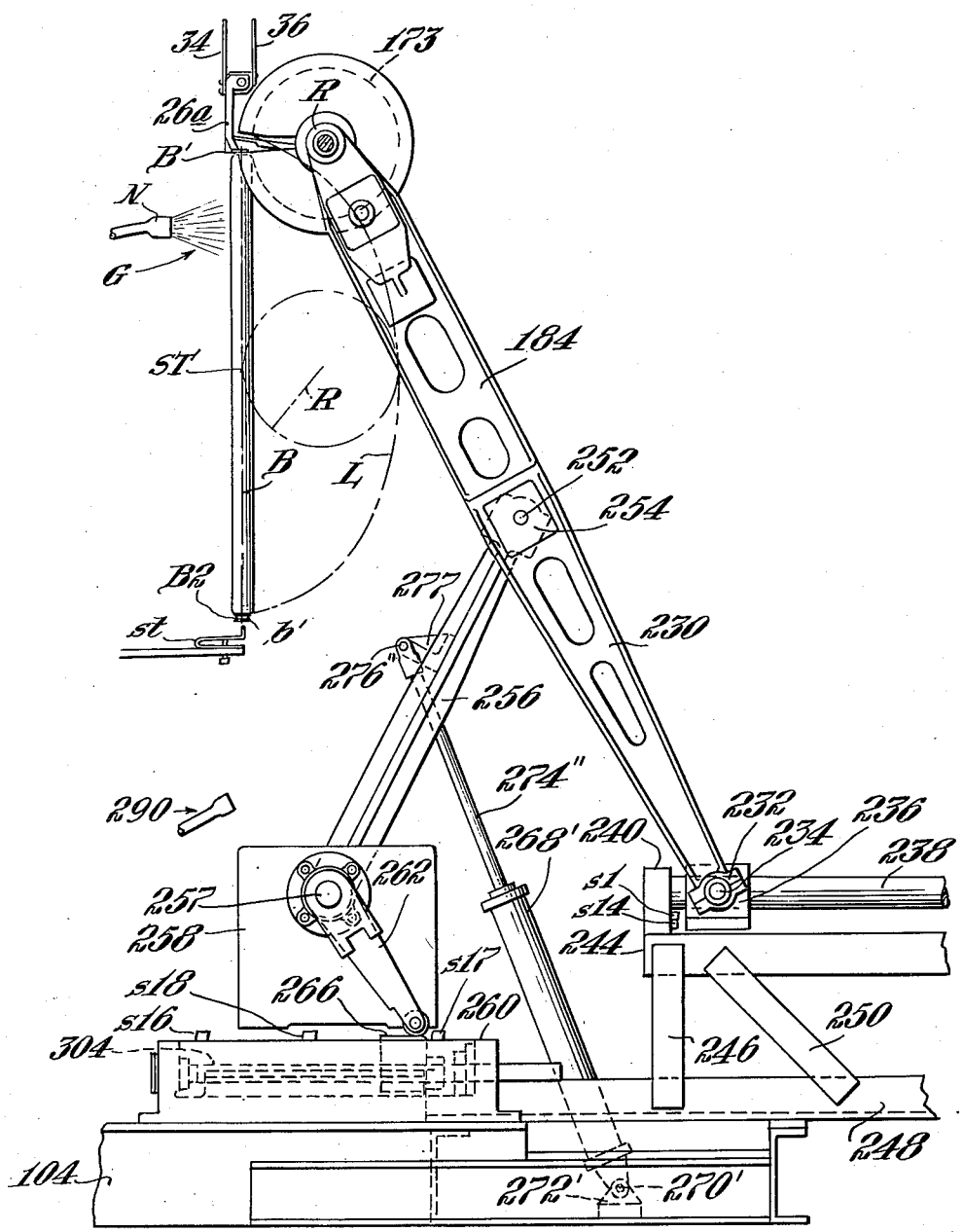

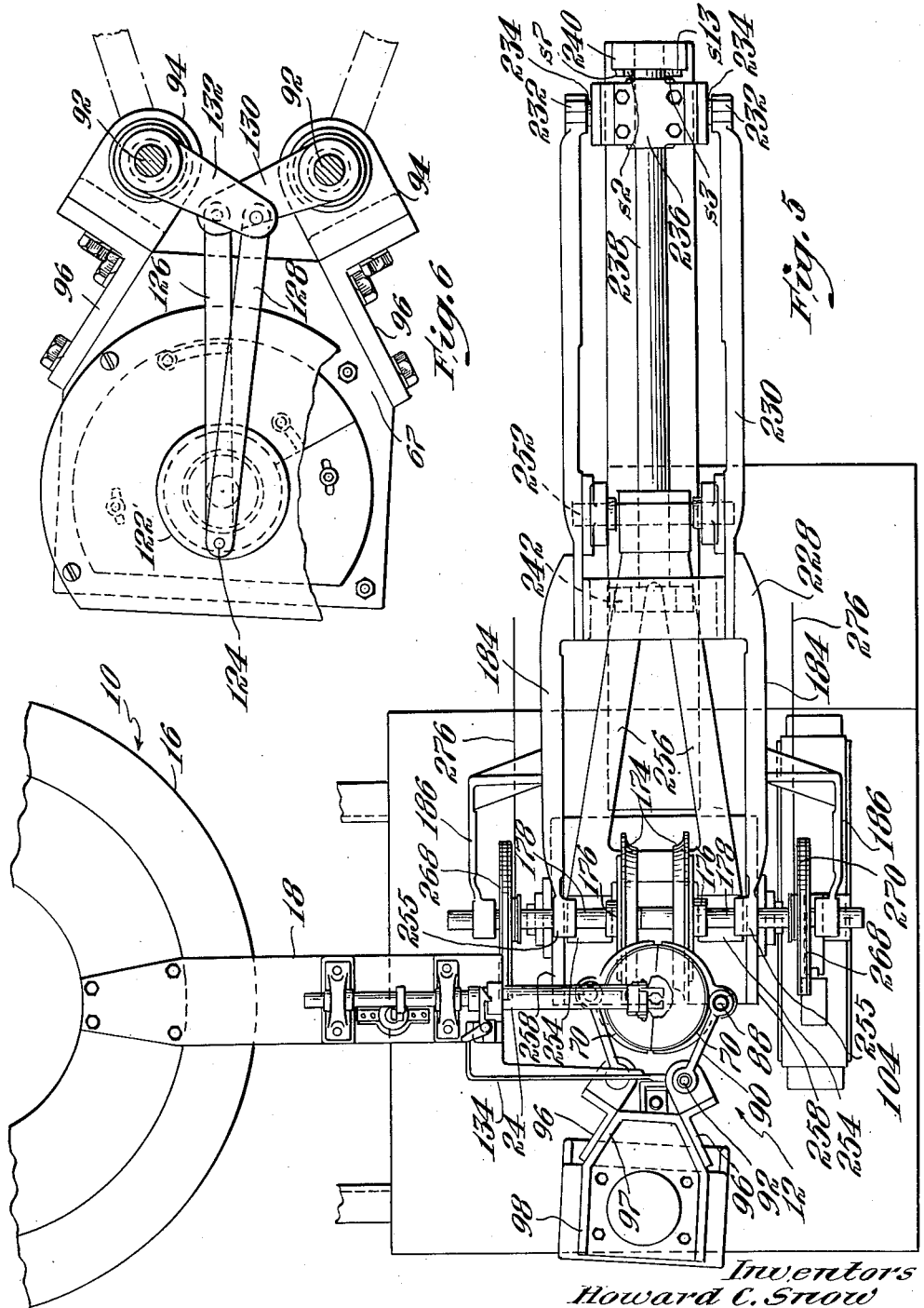

Sept. 23, 1952  H. C. SNOW ET AL  2,611,216
METHOD OF AND MACHINE FOR MAKING CIRCULAR FLUORESCENT LAMPS
Filed March 25, 1949  8 Sheets-Sheet 5
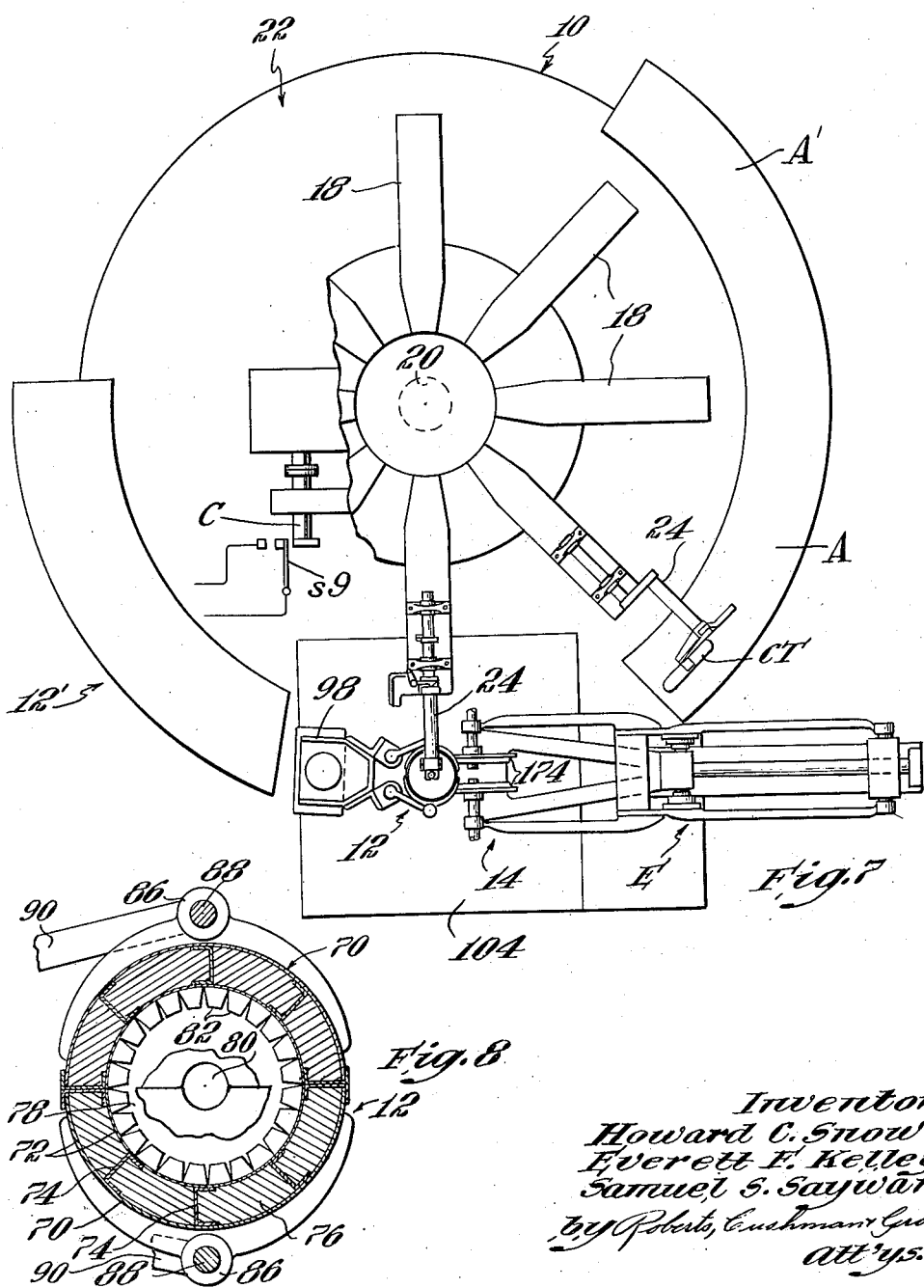
Inventors
Howard C. Snow
Everett F. Kelley
Samuel S. Sayward
by Roberts, Cushman & Grover
att'ys.

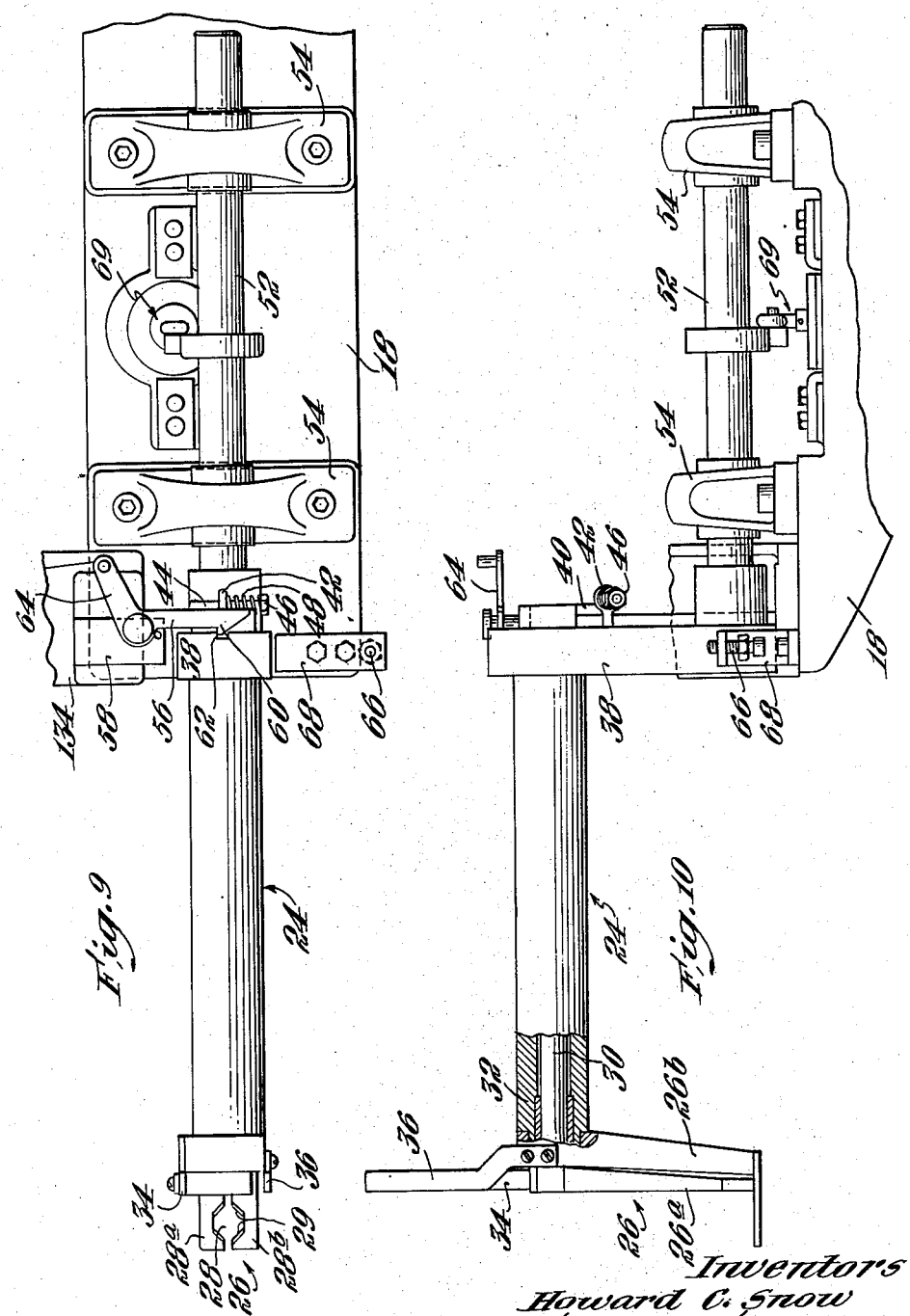

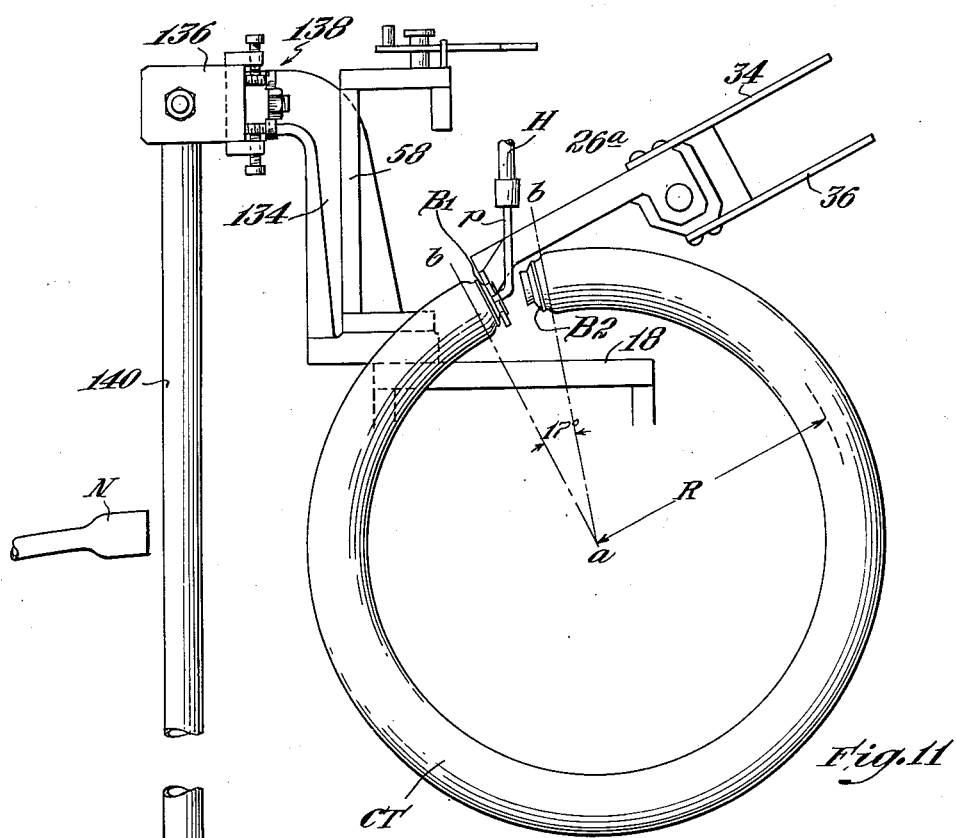
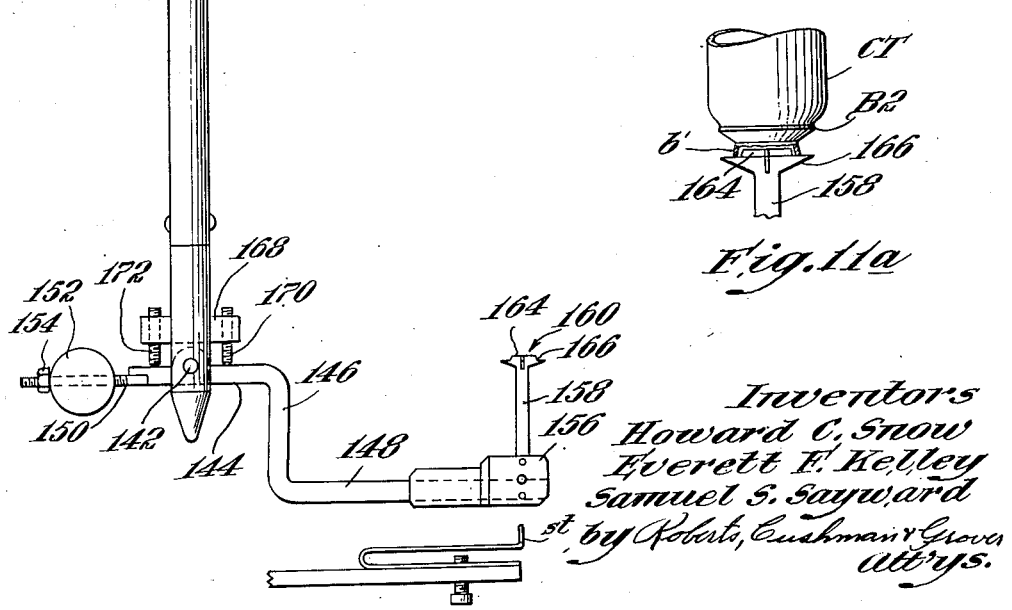

Patented Sept. 23, 1952

2,611,216

UNITED STATES PATENT OFFICE 2,611,216

METHOD OF AND MACHINE FOR MAKING CIRCULAR FLUORESCENT LAMPS

Howard C. Snow, Swampscott, Everett F. Kelley, Melrose, and Samuel S. Sayward, Danvers, Mass., assignors to Consolidated Electric Lamp Company, Lynn, Mass., a corporation of Massachusetts Application March 25, 1949, Serial No. 83,356

19 Claims. (Cl. 49—7)

1

This invention relates to a method of and machine for making circular or curved fluorescent lamps, the principal objects being to provide a method of converting partially manufactured straight glass tubes of the type commonly employed in the manufacture of straight fluorescent lamps into substantially circular lamps of uniform curvature and cross-section; and to provide a machine which will bend partially manufactured straight tubular lamps or bulbs placed therein into substantially circular form. Other objects are to provide a machine in which straight lamp tubes may be loaded on at one point and stepped along at suitable intervals to instrumentalities which will convert the straight tubes into circular form, the foregoing being accomplished rapidly, efficiently and with greater uniformity than could be possibly attained by prior methods or machines. Still other objects are to provide a machine which is automatic or semi-automatic in operation, which is simple in construction and is substantially foolproof.

In accordance with the foregoing objects a partially manufactured lamp consisting of a straight, hollow glass tube, preferably coated on the inside, having sealed in mounts at its ends, the mount at one end having an exhaust tube attached thereto and having clamp caps secured to its ends; is held suspended at the exhaust tube end in a substantially vertical position while in a softened condition and its lower end is then gripped and rolled upwardly about a center which lies along a line parallel to its vertical axis and distant therefrom by an amount equal to the radius of the circle to be formed.

In accordance with one aspect of the method herein illustrated, the partially manufactured lamp tube is differentially plasticized so that one side is softer than the other and is then bent to substantially circular form so that the softer side will be at the inside of the completed lamp. In practice the lamp tube is exposed as a whole to controlled heat to plasticize its walls and then one side is cooled somewhat to lower its plasticity particularly along the portion of the tube which will constitute substantially the lower outer half of the rolled-up tube as supported during bending and prior to final setting. Cooling is effected by playing currents of gas or air over the surfaces of the tube. It is also contemplated that air or a rare gas may be introduced to the interior of the lamp at progressively increasing pressures throughout the rolling operation to prevent wall collapse.

The machine includes a series of supports which travel in a generally closed path so as to be moved at suitable intervals through a series of stations in succession, and at one station to hold a partially manufactured lamp hereinafter to be referred to as the lamp suspended by its upper end within the confines of an oven which heats the lamp until it softens, whereupon it stretches somewhat under its own weight. The oven is sectional and elongation of the lamp effects actuation of means which opens the oven by separating one section from the other, brings gripper means into operation in a manner to grip the lower end, and then effects movement of the gripper means upwardly relative to the lamp to roll the lamp upwardly about a circular mold member constituting a part thereof. Jets are arranged next to the oven to play streams of air or other gaseous medium on the side of the lamp which will constitute the outside when rolled up near its upper end when the oven is open, thereby to cool this portion of the wall just before it is rolled up.

The mold member is in the form of a pair of separable disks which together have in their peripheral surface a shallow, semi-circular groove which is the converse of the curved surface of the straight lamp. The gripper means comprises a pair of cooperating gripper elements, one carried by each of the disks, the latter when brought together to form the groove-effecting engagement of the gripper elements with the lower end. At the moment that upward movement of the mold member is started, air or rare gas under pressure is introduced to the interior of the lamp and is uniformly increased in pressure throughout the rolling operation. At the upper limit of its movement the mold member dwells for a predetermined length of time to permit the rolled up lamp to set, then releases the lamp, and finally descends to its initial position. At this point the support turns through one step so as to carry the rolled up lamp to the next station of the machine and simultaneously to bring another straight lamp into the oven or ovens and to close the latter. At the succeeding station there is means for rocking the support to rotate the circular lamp through an angle which will tip the plane of the upper end from a substantially horizontal position to a nearly vertical position to bring the exhaust tube to a nearly vertical position in readiness to be connected to an exhaust pump.

The invention will now be described in greater detail with reference to the accompanying drawings in which:

Fig. 1 is a front elevation of the machine showing the mold member in its initial inoperative position;

Fig. 2 is a fragmentary front elevation of the machine showing the mold member at the top of its vertical travel after having rolled a straight tube into circular form;

Fig. 3 is a plan view of the mold member in the inoperative position with the jaws separated;

Fig. 4 is a detail of limit means for controlling the position of the jaws at the beginning and end of movement of the mold member;

Fig. 5 is a plan view of the machine looking down at the top of the oven with part of the index head and the operating mechanism omitted;

Fig. 6 is a plan view to larger scale of the oven-opening mechanism;

Fig. 7 is a plan view of the indexing head showing the supporting arms, the preheating station, the bending station and the annealing station;

Fig. 8 is a horizontal section on a larger scale of the oven;

Fig. 9 is a plan view of one of the supporting arms;

Fig. 10 is a side view in elevation of Fig. 9;

Fig. 11 is a side elevation of the gripper for the top end of the lamp showing it tilted to one side to permit exhausting the tube and the details of the control trigger;

Figure 12:
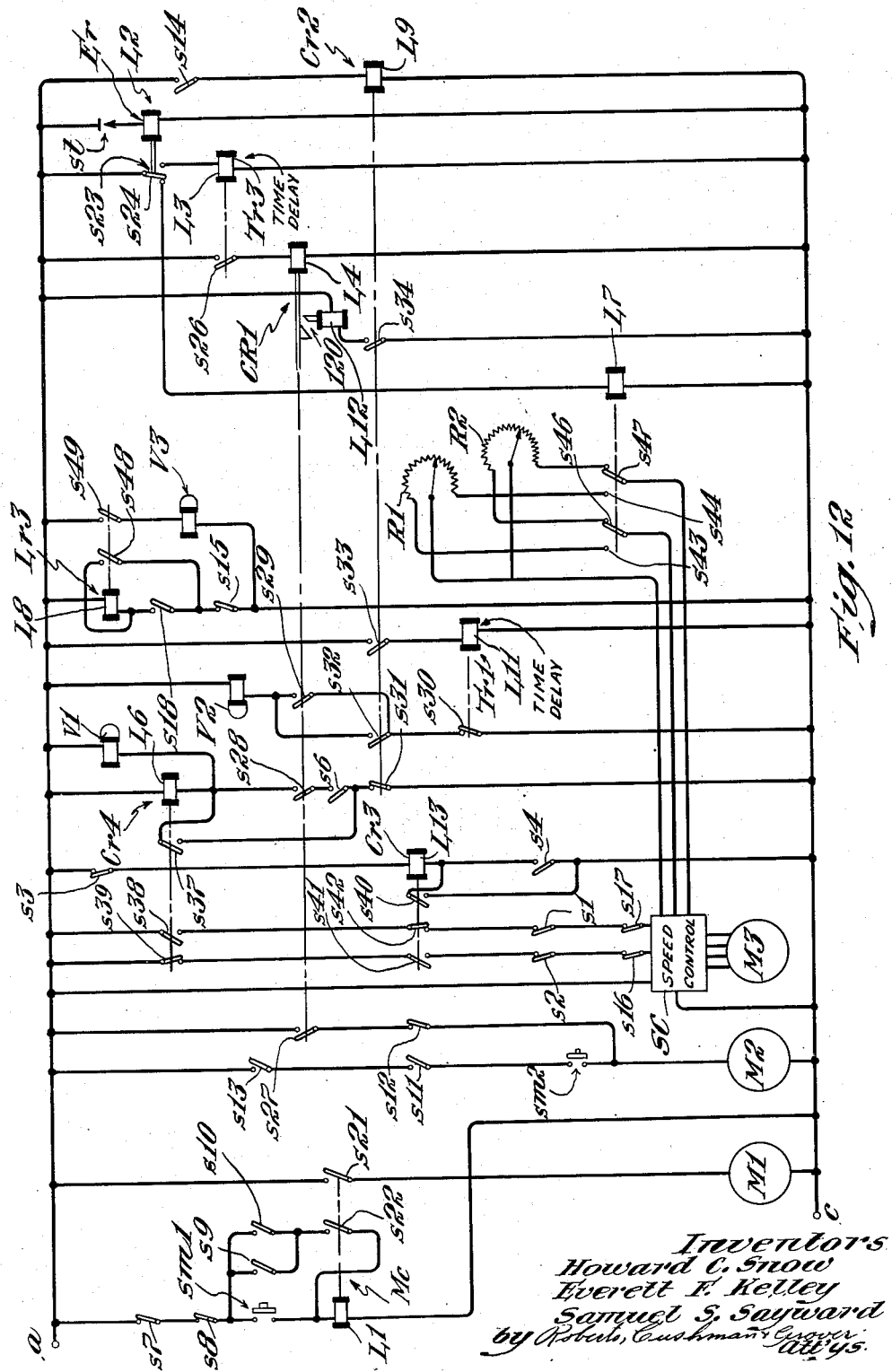

Fig. 11ª shows the head of the trigger to larger scale supporting the lower base of the lamp; and Fig. 12 is a schematic layout of the control circuit for the machine.

As disclosed herein according to the method aspect of this invention, a straight partially manufactured fluorescent lamp tube ST (Fig. 2), having sealed-in mounts and metal clamp caps B1 and B2 at its opposite end, is softened by heating and then rolled up into substantially circular shape, as shown at CT (Fig. 11) wherein the ends are brought together to form a nearly complete circle. The distance between the shoulders of the rolled-up tube just behind the clamp caps is represented by the angle between the dot-and-dash lines a—b, a—b extending from the geometric center of the rolled-up tube through these shoulders, and this angle is approximately 17 degrees but will vary with lamps of different size. Formation of this circular tube is effected after the tube is softened by supporting the upper end (Fig. 2) of the tube and then moving the lower end of the tube along a line L, which is cycloidal in shape, whose base is represented by the dot-dash line B, which is the center line of the suspended tube and equal in length thereto, and which is generated by rolling a circle having a radius R equal to the median radius of the completed circular tube along this base. Prior to rolling the tube, a stream of air G or other gaseous medium is played on one wall of the plasticized tube near its upper end to make this side somewhat less plastic so that when the tube is wrapped about the mold member, as will appear hereinafter, the softer side wall will be next to the mold and the less plastic side will be outside. The cooling air may also be played on the tube at its lower end or even throughout the entire length thereof.

The apparatus for converting the partially manufactured straight lamp tubes, hereinafter to be referred to as lamps, to circular form will now be described, and consists generally of an intermittently rotatable support or indexing head 10 (Figs. 5 and 7) for delivering straight lamps one at a time to heating means consisting of a preliminary heating unit 12' and a final heating unit 12, where each lamp is heated sufficiently to soften its walls, and a molding or bending device 14 which will manipulate the softened lamp in a manner to roll it into substantially circular form.

The indexing head 10 is designed to accommodate a plurality of lamp tubes, and, as illustrated in Figs. 5 and 7, comprises a spider 16 having fixed to it and extending radially therefrom eight equally spaced arms 18. It is to be understood that the index head may be designed to carry a larger or smaller number of lamp tubes, and that each arm may be adapted to carry one or more lamps arranged radially so as to travel in substantially parallel paths if, for example, the machine was made duplex thereby to double production. The spider is fixed to the upper end of a vertical shaft 20, the latter being secured in suitable bearings provided in a pedestal-like base 22 which supports the same from the floor. A motor M1 (Fig. 12) imparts rotation to the shaft 20 intermittently in accordance with control means and in conjunction with the operation of the other parts of the machine as will appear hereinafter.

Each arm 18 has mounted on it, as will appear hereinafter, an extension 24 (Figs. 9 and 10) which has at its outer end clamping means 26 for gripping and holding the upper clamp cap B'. As illustrated, the clamping means 26 is comprised of a pair of depending legs 26ª and 26ᵇ, at the lower ends of which are horizontally arranged cooperating jaws 28ª and 28ᵇ forming a diamond-shaped opening 28 defined by four quadrilaterally arranged straight edges 29 for engagement with the metal clamp cap B1 of the tube. As illustrated (Figs. 2 and 11ª), the metal clamp cap has a conical projection b' and the edges 29 are undercut so as to mate with the sloping wall thereof.

The extension 24 is comprised of a solid shaft 30 and a hollow shaft 32 concentrically arranged, and the legs 26ª and 26ᵇ are fixed, respectively, to the shafts 30 and 32. A pair of upwardly projecting arms 34 and 36 are fastened, respectively, to the upper ends of the legs 26ª and 26ᵇ. The inner end of the hollow shaft 32 is fixed to the upper end of a post 38, the latter being secured at its lower end in a normally upright position to a horizontal shaft 52 on the radial arm 18. On the inner end of the shaft 30 there is fastened an arm 40. Below this arm there is fixed in the post 38 a stud having an eye 42 through which there is passed a bolt 44, one end of which is fastened to the arm 40, and the other end of which is threaded to receive a nut 46. Between the nut 46 and the eye 42 there is placed on the bolt a compression spring 48 so that the arm 40 is constantly urged to turn in a clockwise direction, as seen looking outwardly along the arm 18, and hence to rotate the leg 26ª in a direction to hold the clamping jaw 28ª at its lower end close to jaw 28ᵇ. When it is desirable to release a cap held between the jaws 28ª and 28ᵇ, the operator may grasp the projecting arms 34 and 36 in his hand and squeeze them toward each other, thereby to rotate the arm 26ª away from the arm 26ᵇ against the action of the spring 48.

As will appear hereinafter, it is desirable to turn the clamping means 26 from its initial position in which the plane of the upper cap is substantially horizontal (Fig. 2) to an inclined position (Fig. 11). Accordingly the shaft 52 is mounted to turn in a pair of spaced bearings 54, the latter being fixed to the top side of the arm 18. The post 38 is normally held in its vertical position by a latch 56 pivotally fastened to a post 58 fixed to the arm 18, and has at one end a lip 60 adapted to engage a notch 62 formed in the face of the post 38. A tail 64 carried by the latch is provided by which the latch may be retracted to withdraw the lip 60 from the notch 62 and hence to release the post 38. The post may then be tipped in a clockwise direction to an inclined position where it rests against and is limited in its movement by a stop screw 66 threaded into a bracket 68, the latter being fastened to the arm 18. A rod 69 is connected at its upper end to the shaft 52 and at its lower end, which passes through the arm, to a dashpot not shown for cushioning the part 38 as it is tilted over onto the stop 66.

The principal heating means 12, into which a tube supported in a vertical position from the arm 18, as heretofore described, is moved for heating, comprises (Fig. 8) a substantially cylindrical chamber or oven made up of two semi-cylindrical parts 70 arranged with their open sides facing each other. Each semi-cylindrical part has spaced cylindrical walls 72 held in rigid relation to each other by suitable structural members 74 to provide a space 76 for insulating purposes. The upper end of each semi-cylindrical section has a closure plate 78, a part of which is cut away to form a semi-cylindrical opening 80 of a size to permit passage of the clamping means 26 through it into the oven. The lower end is also closed except for an opening, not shown, of sufficient size to permit the post 158 of the trigger to project upwardly through it into the oven. On the inner wall 72 of each semi-cylindrical section there are fixed a plurality of porcelain or other ceramic members 82 upon which are mounted conventional heating elements in the form of coiled wires. To support the halves of the oven for movement to and from each other, that is, to receive a tube as it approaches the oven and then to close about the tube for heating, each half has fixed thereto vertically spaced bosses 86 through which are aligned vertical openings. A pintle 88 is placed in the bosses and on its upper and lower ends is pivotally mounted one end of each of a pair of arms 90 (Figs. 5 and 8). The arms are pivoted at their opposite ends on a vertical rod 92. There is a vertical rod 92 for each half of the oven (Figs. 1, 5 and 6), and these rods are situated in spaced parallel relation to each other in vertically spaced bearing members 94 fastened to the forwardly extending flange of angle members 96, these latter being bolted to converging walls 97 of a head casting bolted to the upper end of a channel beam 102. The lower end of the channel beam 102 is fastened to a base 104 fabricated of C-shaped beams welded together to form a rigid support for the machine as a whole. Between the walls of the channel 102 there is secured a horizontal web 106 (Fig. 1) in which there is journaled a vertical shaft 108, the lower end of which has attached to it a sprocket 110. A chain 112 connects this sprocket to a sprocket 114 carried by a shaft 116 which rises from a gear reduction unit 118 attached to an electric motor M2 fastened to the base of the machine. The oven motor M2 (Fig. 1) provides the power for opening and closing the oven, and is operated at the proper times in the sequence of operations, as will appear hereinafter. The upper end of the shaft 108 has fixed thereto a disk 122 (Fig. 6), and to the upper surface of this disk there is fastened by a pivot 124 one end of each of a pair of links 126 and 128. The opposite ends of the links are connected, respectively, to a pair of arms 130 and 132, these in turn being fixed to the lower ends of the vertically spaced rods 92. Rotation of the disk 122, accordingly, will impart movement to the arms 130 and 132 in opposite directions and hence rotate the rods 92 in opposite directions to separate the halves of the oven or to bring them together.

The heating period will depend upon the kind of glass, thickness thereof, and various other factors and may be shortened to speed up the operation of the machine as a whole, by providing one or more preheating ovens 12' (Fig. 7), only one being shown herein, situated far enough ahead of the principal oven 12 to contain within its confines the succeeding tube on the index head so that while one tube is in the oven 12 receiving its final heating, one or more tubes will be undergoing preheating. The preheating oven may even be of sufficient length to contain a plurality of tubes. The details of the preheating oven are not described herein since it may be of conventional design.

There is also situated ahead of the oven 12 a nozzle N (Figs. 2 and 11) which is supplied with air or other gas under pressure, the nozzle being situated so as to play a stream of air or other gaseous medium over one wall of the lamp near one end and on the side which will form the outside of the rolled-up lamp. While the cooling air may be played over the entire length of the lamp along that side, the important part to be cooled is that portion beginning at the upper end and extending downwardly a distance which will be substantially commensurate with the lower half of the circular lamp, that is, approximately one half of the length of the lamp when rolled up. The stream of air, as shown, is delivered continuously during operation of the machine and impinges upon the lamp only when the oven is open. Valve means may, however, be provided for cutting the air on and off in time with the opening and closing of the oven.

There is also fastened to the extremity of each of the arms 18 a bracket 134 (Fig. 11) which rises substantially vertically therefrom and has at its upper end a forwardly extending horizontal portion to which there is adjustably attached a trunnion 136, the adjustable attachment being shown at 138. Fixed to and extending vertically downward from the trunnion is a rod 140, the lower end of which terminates in the vicinity of the lower end of the oven 12. Near the lower end of this rod 140 there is pivotally attached at 142 a trigger mechanism consisting of an arm 144 which has a downwardly offset horizontal portion 148 connected thereto by a vertical portion 146. A screw 150 is fastened to the free end of the horizontal portion 144 and has on it a weight 152, the position of which along the screw may be adjusted by rotating it and may be fixed by a nut 154. The horizontal portion 148 extends beneath the oven, and fixed to its free end is a block 156 from the top side of which there projects upwardly toward the oven and substantially coincident with the vertical axis thereof a post 158 which has at its upper end a head 160. The head is comprised of four radially extending blades spaced 90 degrees apart, each of which has a horizontal portion 164 and an upwardly inclined portion 166. The horizontal portions 164 are adapted to receive the peripheral edge of the lower clamp cap and to support the same while the inclined portions 166 act as a pilot to guide and center the end of the lamp onto the supporting edges. When the lamp becomes softened to such an extent that it stretches by its own weight, it pushes the head downwardly and causes the arm to tilt on the pivot 142 in a clockwise direction. Normally the weight 152 acts as a counterbalance and holds the arm in a substantially horizontal position, and to limit its initial position there is provided a stop pin 170 threaded through a bar 168 fastened to the post 140. To limit its downward movement under the influence of the descending lamp, a second stop pin 172 is threaded onto the bar 168 at the opposite side of the rod 140. The pivoting movement of the trigger arm actuates a switch st, to be hereinafter described. It is to be observed that the trigger arm is limited in its downward movement so that it actually supports the lower end of the lamp after it is depressed, preventing further elongation during the heating period which is continued for approximately four seconds.

The molding or bending means for rolling the lamp into circular form has associated therewith clamping means 171 (Fig. 1) for engaging the lower clamp cap B2 of the lamp and an annular groove 173 of semi-circular cross-section for receiving the lamp and holding it against lateral displacement during the rolling operation. As illustrated (Figs. 3 and 5), the mold comprises a pair of disk-like members 174 made of some heat-resistant material such as carbon, each of which has one half of the semi-circular surface which forms the annular groove. The mold members 174 are normally separated, but upon depression of the foregoing head 160 of the trigger mechanism and actuation of the control circuit, a motor M3 (Fig. 1) is started which raises them by way of an elevator E toward the lower end of the lamp, brings the clamping means together about the clamp cap, and then moves them vertically upward parallel to the axis of the lamp to effect rolling thereof. To effect the foregoing movement, each mold member 174 has integral therewith a hub 176 which is fastened to the inner end of a horizontal shaft 178 mounted for transverse sliding movement in a pair of spaced bearings 180 and 182, the former being integral with the forward end of an arm 184 which is fastened to the elevator E, and the latter with an arm 186 parallel to the arm 184 and attached thereto at its rear end. Mounted on each shaft 178 is a pair of collars 188 and 190, the former having associated therewith a thrust bearing 192. Between the thrust bearing 192 and the collar 190 there is situated a spool 194 mounted on a pin 196 projecting from the underside of an arm 198, the arm in turn being pivotally attached at 200 to a bracket 202 bolted to the arm 184. At the rear end of the arm 198 there is pivotally fastened at 204 one end of a link 206, the opposite end of which is pivotally connected to a block 210 fastened to a piston rod 212 which forms part of a piston and cylinder assembly 214 fixed to the elevator. Introduction of compressed air or some other fluid to the piston and cylinder assembly 214 will effect movement of the piston rod 212 in a direction to turn the arms 198 about the pivots 200 in opposite directions to shift the shafts 178 to the left or right, as shown in Fig. 3, and hence to move the mold members 174 toward each other. As illustrated, air is delivered to the piston and cylinder assembly 214 when the machine is set into operation so that prior to and during the upward movement of the mold members to roll the lamp, the piston rod 212 is constantly urged in a direction to move the mold members toward each other. A solenoid-controlled valve V2 is provided for admitting air to the cylinder in one direction and to cut off the air at the proper time, as will appear hereinafter. A spring 211 secured between the rear ends of the arms 198 separates the mold members and hence the jaws when the air is cut off. Movement of the mold members together, however, is restrained prior to engagement with the lamp by links 216 (Fig. 3) pivotally connected at 218 to brackets 220 on the arms 184 and midway between their ends by links 222 to the arms 198. The links 216 are engaged with the outer edges of vertically arranged cam bars 226, these cam bars holding the links 216 spread apart, as indicated, and thus holding the arms 198 against movement in a direction to close the mold members. As the mold members rise to a position opposite the lower end of the lamp, however, the links 216 ride out of engagement with the cam bars 226, thus releasing the arms 198 and allowing the rod 212 to impart the motion necessary to bring the mold members together into clamping engagement with the lower clamp cap. To effect vertical movement of the mold members, the elevator E has extending rearwardly therefrom a pair of spaced arms 230 which have at their extremities bosses 232 pierced to receive the ends of trunnion pins 234 (Fig. 5) fixed to the opposite sides of a crosshead 236. The crosshead 236 has an opening therethrough and is slidably mounted on a horizontal shaft 238 which passes through the opening and affords a track along which the head can slide. The shaft 238 is fixed at its ends in posts 240 and 242 (Fig. 1), these in turn being fixed to a base plate 244 supported by legs 246 on a portion of the frame 248 and cross-braced to provide the proper rigidity by members 250. As thus constructed, the crosshead 236 can slide forwardly and rearwardly along the shaft 238. To effect the aforesaid movement, a pin 252 (Fig. 3) is fixed between the arms 230 and on this pin there is journaled one end 254 (Fig. 2) of an A-shaped driving member 256, the legs of which have at their ends bosses 255 (Fig. 5) which are journaled on a horizontal shaft 257 (Fig. 2), the latter being journaled in spaced vertical plates 258 which form a part of the frame of the machine. The shaft 257 extends through the forward side of one of the plates 258, as shown in Fig. 1, and has fixed thereto an arm 262, the free end of which carries a follower 264 arranged to bear against a traverse block 266 mounted on a worm or lead screw 304 (Fig. 2) connected for rotation to the motor M3. Rotation of the lead screw 304 moves the traverse block 266 which in turn effects movement of the arm 262 in a counterclockwise direction, thus turning the A-shaped driving member 256 in a counterclockwise direction to lift the elevator upwardly and forwardly. The proportions of the various operating parts are such that during the lifting movement the geometric center of the mold member moves along a line which is vertical and is parallel to the axis of the suspended lamp. To assist in raising the elevator, there is provided an air cylinder 268 (Figs. 1 and 2) pivoted at its lower end 270 to a bracket 272' fastened to the frame of the machine and having at its upper end a piston rod 274" which is pivotally connected at 276" to the A-shaped member 256 by way of a bracket 277. Simultaneously with the movement of the arm 262 in a direction to produce upward movement of the elevator, air is admitted to the cylinder 268' to impart an upward thrust to the piston rod 274 and hence to lift the elevator. In practice, sufficient air pressure is admitted to the cylinder to do about two-thirds of the work necessary to raise the elevator through the desired distance, thus relieving the mechanical means, that is the motor M3, from an undue load and permitting the use of a small motor. During the downward movement of the elevator, the cylinder 268 acts as a dashpot to cushion the descent of the elevator which is quite heavy, there being an adjustable bleeder orifice therein to allow the air to escape slowly. Air is admitted to the cylinder on the upward stroke by a solenoid-controlled valve V1, and is bled from the cylinder during descent through the adjustable orifice.

To produce rotation of the bending mold as it ascends, thereby to roll the softened partially manufactured lamp about the mold, there is fastened to each shaft 178 a disk 268 over which passes a flat flexible band 270, one end of which is fastened to its periphery, and the other end of which drops vertically downward through a guide slot 272 (Fig. 1) in a projection 273 formed on the plate 258 and has on its lower end a block 274. When the mold members are in their lowermost position, the bands hang below the projections 273. As the mold rises, the bands slide through the slots 272 until the blocks 274 strike the lower side of the projections 273 whereupon the shafts and hence the mold members begin to turn. The blocks 274 may be adjusted on the bands so that rotation of the shafts will not begin until the jaws 171 have gripped the lower end of the lamp and also provides for adjusting the position at which rotation will begin to take place. To return the molds to their original position upon descent of the elevator, cables 276 are wrapped about grooved hubs 278 on the disks 268 and secured at one end thereto and at their opposite ends to one end of tension springs 280, the opposite ends of which are fastened to the frame of the machine. It is to be understood that other means may be provided for this purpose, for example, a simple arrangement of gearing.

The jaws 171, which grip the lower base of the lamp, comprise a pair of flat strips 286 (Fig. 3) set into the disks on a radius thereof and having on their inner cooperating edges truncated notches 288.

To prevent the lamp from cooling too rapidly as it is rolled up, the mold members are, while in their lowermost position, continuously heated by a gas jet or burner 290 (Fig. 2) situated therebelow and directed against the spaced mold members or by heating elements included in the mold members.

The location of the jaws 171 must be exact, both at the beginning of the operation and at the end thereof, so that there will be no failure on the part of the jaws to grip the lower end of the base and no over-run at the top which would stretch the lamp more than it should be. Accordingly plates 294, carrying two bosses and adjustable stop screws 296 and 298, are fastened rigidly to the ends of each of the shafts 178. An arm 292 is pivoted to each plate 294 and free to swing between the stop screws 296 and 298. An anchor plate 300 surrounds the shaft 178 and is fastened solidly to the boss 182. The anchor plate carries a pin 301 which projects outwardly beyond the arm 292 at all times. When the foregoing parts 294 and 292 are at the positions to begin the bending operation, the arm 292 is forced against the pin 301 by the plate 294 and stop screw 296. In this position the jaws 171 are horizontal. As the mold members rotate counterclockwise, as viewed in Fig. 1 during the ascent of the elevator, the arm 292 travels completely around until it comes to rest against the pin 301 on the opposite side and with the stop screw 298 pushed against it. This limits the rotation of the mold at the upper end of the bending operation.

The lead screw 304 for traversing the slide block 266 is driven by the motor M3 mounted on the base. This motor is driven first in one direction to raise the elevator and hence the mold members to the top, and then in the reverse direction to bring the mold members down to their original position. Time delay means Tr1, to be described hereinafter, holds the mold at the top temporarily to permit cooling of the rolled lamp. Preferably the lead screw is rotated slowly until the jaws grip the lower end, then rapidly to raise the elevator to the top where it dwells and finally descents rapidly to its original position. As soon as the completed lamp is released by the mold members and they have had time to descend, the index head is stepped around through one position and carries the rolled-up lamp to the next station where it may be annealed and then transferred to a machine for exhausting it or the present machine may be provided at this station with a combined annealing oven and exhausting apparatus.

While the lamp is soft, and particularly during the rolling operation, there is a tendency for its walls to become somewhat flattened or distorted both by the bending operation and by the tendency for the softened walls to collapse. Accordingly, air or rare gas under pressure is introduced to the interior of the lamp and maintained therein from the moment the bending is initiated until it is completed and the lamp walls have cooled. As illustrated, each arm 18 is provided with a flexible hose H (Fig. 11) having a valve V3 (Fig. 12) therein, one end of the hose being connected to a source of air or rare gas pressure, and the other of which may be pressed over the projecting end of the exhaust tube P extending through the upper end of the lamp and providing communication with the interior thereof. Means is also provided for automatically opening the valve V3 at the instant the mold begins to bend the lamp, and there is interposed between the valve and the connected end thereof an orifice of such size that the compressed air or gas is admitted under progressively increasing pressure throughout the rolling operation so that the pressure increases with the stiffening of the lamp and the increase in bending thereof. The predetermined range necessary for securing the desired results will vary with the kind of glass, size of the tube and temperature at which the tube is heated. At the conclusion of the rolling operation the valve is closed, and when the lamp moves to the next station the flexible hose is pulled from the end of the lamp.

The power for effecting actuation of the parts of the machine is derived from the foregoing motors M1, M2 and M3, and a control circuit therefor will now be described with reference to Fig. 12.

The motor M1 for rotating the index head 10 is energized from the terminals a and c of a conventional power source (not shown) by means of the normally open contacts s21 of a relay Mc operated by a solenoid L1. The solenoid L1 is energized from the power source terminals a and c by means of a momentary contact push button switch sm1 which completes a circuit through the limit switches s7 and s8. The switch s8 is operated by the hinge rod 92, being closed when the oven parts 70 are open so that a lamp can be moved into the oven chamber by the index head 10. The switch s7 is positioned on the end post 240 whereby the crosshead 236 closes the switch when the elevator is in the down position out of the path of the index head 10.

The energization of solenoid L1, as above, conjointly closes the holding contacts s22 which are connected in parallel with the push button sm1 by the parallel limit switches s9 and s10 thereby maintaining an energizing circuit for the solenoid L1 after the push button sm1 is released. The switch s9 is opened by a cam on the end of a cam shaft C driven by the index head 10. The switch s10 is opened by an arm 18 as the preceding arm reaches the plasticizing and bending station. It will be evident that both of these switches must be opened to drop out the relay Mc, thus stopping the motor M1.

After the lamp is positioned in the bending position by the index head 10, as described, the oven is closed by energizing the motor M2 from the power source terminals a and c by means of a manually operated push button switch sm2. This motor energizing circuit also includes a normally closed limit switch s11 operated by the oven hinge rod 92 and a normally open limit switch s13 located upon the end post 240 and closed by the crosshead 236 when the elevator is in the down position. The energization of the motor M2 by means of the above circuit revolves the disk 122 through 180 degrees so that the links 126 and 128 rotate the hinge rod 92 to open the oven parts 70 whereupon the limit switch s11 opens to deenergize the motor M2.

The lamp stretches as it softens in the oven, thereby elongating until the lower end thereof trips the trigger mechanism including a switch st thereby to complete a circuit energizing a solenoid L2 of a relay Er to close its normally open contacts s23 and conjointly open its normally closed contacts s24. The relay Er is preferably of the electronic type requiring only a change in the potential upon the control electrode of a vacuum tube to energize the solenoid L2 thereby to transfer its contacts.

The closing of the contacts s24 energizes a time delay relay Tr3 from the power source terminals a and c. After a time delay of approximately four seconds, the relay contacts s26 are closed by a solenoid L3, the relay time delay components, which are available as elements of a commercial relay, being omitted from the drawing for simplicity.

The delayed closing of the contacts s26 energizes a solenoid L4 of a relay Cr1 thereby to open the normally closed contacts s27 and concomitantly to close the normally open contacts s28 and s29, the contacts being restrained in the transferred position by means of a detent which is shown schematically as the latch 120. The contacts s29 complete a circuit through the normally closed contacts s30 of a second time relay Tr1 to energize the solenoid-operated valve V2 controlling the air supply to the air cylinder which closes the bending rolls.

The closing of contacts s27 completes a circuit paralleling the push button sm1 to energize the oven motor M2 through a normally closed switch s12 thereby revolving the disk an additional 180 degrees to its original position, thus opening the oven parts 70. The limit switch s12 is arranged so that it is opened by the oven hinge rod 92 when the oven is completely opened, thus deenergizing the motor M2. The opening of the oven also closes another limit switch s6 to complete a circuit between the terminals a and c which includes a solenoid-operated valve V1 controlling the air supply to the elevator air cylinder 268, the contacts s28, the limit switch s6 and the normally closed contacts s31 of a relay Cr2.

Connected in parallel with the solenoid of the valve V1 is a solenoid L6 of a relay Cr4 whereby the energization of the valve solenoid conjointly energizes the solenoid L6 to transfer the normally open contacts s37 and s38 and the normally closed contacts s39. The contact s37 acts as a holding interlock paralleling the contacts s28 and the switch s6 so that the opening thereof does not deenergize the solenoid valve V1 and the relay solenoid L6.

The contacts s38 and s39 are in the forward and reverse circuits, respectively, of a speed control device, for the elevator motor M3 which is designated SC in Fig. 12, the forward motor circuit which includes the relay contacts s38, the normally closed interlocking contacts s42 of a relay Cr3, and the limit switches s1 and s17 being substituted for the conventional forward starting push button station of the speed control device. The normally closed limit switch s1 is positioned on the post 242 so that it is contacted by the crosshead 236 when the elevator is in the uppermost limit of its travel thereby to stop the motor M3. The normally closed limit switch s17 acts as a safety interlock protecting the lead screw 304 being located at one end of the frame 260 so that the switch contacts are opened by the block 266 to stop the motor M3 before the block is jammed against the end of the frame. With the elevator in other than its uppermost position, the switches s1 and s17 are both closed so that the closing of the contacts s38 energizes the motor M3 to raise the elevator.

The heretofore described energization of the relay Er by the contact of the lamp against the trigger switch st opens the normally closed contacts s24 thereby interrupting a circuit energizing a solenoid L7, with the result that the normally closed contacts s46 and s47 controlled thereby connect a low speed rheostat R1 to the speed control SC. The motor M3 therefor slowly moves the elevator upwardly until the lamp no longer closes the trigger switch st thereby interrupting the circuit energizing solenoid L2 thus closing the contacts s24 to again energize the solenoid L7. The normally open contacts s46 and s47 close to connect a high speed rheostat R2 to the speed control SC, thereby increasing the speed at which the motor M3 continues to raise the elevator for the actual bending operation.

At substantially the same time that the speed of the motor M3 is increased as described above, the block 266 closes a normally open limit switch s18 located on the frame 260. The switch s18 completes a circuit also including a normally closed limit switch s15 to energize a solenoid L8 of a relay Lr3. The solenoid L8 closes the contacts s49 to energize a solenoid valve V3 thereby supplying air or rare gas under pressure to the interior of the lamp so that it does not collapse during the bending process. The conjoint closing of the contacts s48 completes a holding circuit paralleling the switch s18 to maintain the solenoid L8 energized.

When the bending operation is completed, the limit switch s1 is opened by the block 266 to stop the elevator motor M3. The block 266 simultaneously closes a limit switch s14 to energize a solenoid L9 of a relay Cr2 to transfer conjointly the contacts s31, s32, s33 and s34. The opening of the normally closed contacts s31 deenergizes solenoid L6 so that the contacts s38 and s39 return to their normal positions stopping the motor M3. The solenoid valve V1 is also deenergized by the contacts s31 but the air cylinder continues to support the load of the elevator because of the bleeder orifice referred to heretofore.

The normally open contacts s32 are closed to provide a parallel path for energizing the valve V2 controlling the air supply to the lamp gripping jaws upon the opening of the contacts s29 as described below. The contacts s33 close to energize the time delay relay Tr1 so that its solenoid L11 opens the contacts s30 after the elapse of approximately 20 seconds, thereby providing time for the lamp to set in the bending rolls before the deenergization of the solenoid valve V2 opens the lower gripping jaws. The contacts s34 energize the solenoid L12 thereby opening the latch 120 so that the contacts s27, s28 and s29 of the relay Cr1 returns to their normal position.

When the bending rolls reach their full open position, a limit switch s4 located on the block 210 is closed by the arm 206, thereby energizing solenoid L13 of the relay Cr3 to transfer the contacts s40, s41 and s42. The contact s40 completes a holding circuit for the solenoid L13 in parallel with the limit switch s4. The contacts s42 act as a safety interlock in the forward control circuit. The contacts s41 close to complete the reverse control circuit for the speed control CS which circuit also includes the normally closed limit switches s16 and s2. The switch s2 is located upon the post 240 so that it is opened by the crosshead 236 when the elevator is in the down position. The limit switch s16 is positioned on the frame 260 near the left-hand end thereof, as is shown in Fig. 1, so that it is contacted by the block 266 thereby protecting the lead screw from over-travel.

The completing of the reverse control circuit by the contacts s41, as described above, reverses the motor M3 so that the elevator is lowered toward its down position. During the descent the crosshead 236 contacts the limit switch s15 which is located on the frame member 244 thereby to deenergize the solenoid L8 of the relay Lr3, thus opening the valve V3 supplying air or rare gas to the interior of the lamp. As the elevator reaches the bottom of its downward travel, the limit switches s2, s3, s7 and s13 operate. As described above, the opening of s2 stops the elevator motor M3. The opening of the limit switch s3 deenergizes the solenoid L13 of the relay Cr3 thus returning the contacts s40, s41 and s42 to their normal positions. Switch s7 closes so that the motor M1 for the index head 10 can be started by a subsequent depressing of the push button sm1.

To recapitulate very generally, partially manufactured lamps are loaded on the index head by engagement of the upper clamp cap B1 between the jaws 28a—28b, the oven 12 is heated by turning on the current to its heating coils, the preheating oven 12' is likewise energized, if preheating is employed, and the compressed air or gas conductors are connected to a suitable source of compressed air or gas both to supply air to the lamp during heating and to the cylinders 214 and 268 which, respectively, close the mold members and assist in raising the elevator E. At this point the machine is ready to start and the first step in the cycle of operation is effected by the push button switch sm1 just described which steps the index head one-eighth of a turn to bring the first lamp into the oven 12. The oven is then closed by the push button sm2. It is to be understood that the machine could be completely automatic so that it would perform its entire series of operations merely by actuating the switch sm1. As illustrated hereinafter, however, it is not until the push button sm2 is closed that the operation becomes automatic and is completely under the control of the latch or trigger switch st which, as heretofore described, is depressed by elongation of the lamp upon heating. Depression of the trigger switch st starts the oven motor M2 to open the oven and starts the elevator motor M3 which rotates the traversing screw, hence raising the elevator and hence the molds toward the lower end of the lamp. As the jaws come opposite the lower end, the piston cylinder assembly 214 is actuated to close them on the lower clamp cap, the slack in the strip 270 is taken up, and the molds begin to rotate as the elevator continues to rise. At the upper extremity of its movement the mold members dwell for a sufficient length of time, governed by a time delay switch, to permit the lamp to set, whereupon the air to piston cylinder assembly 214 is cut off, the jaws are separated by the tension spring 211 to release the end of the lamp, the motor M3 is reversed, and the mold members are returned to their initial position, the cylinder 268 serving as a dashpot to cushion the downward movement of the mold members, there being a bleeder valve therein for this purpose. As soon as the mold members come to rest in their initial position, means is actuated to step the index head around one position, that is one-eighth of a turn, so that the completed lamp is moved to the next station in the circuit, marked A, and another lamp is introduced to the oven 12. At the station A, the post 38 is either manually or automatically tilted to an inclined position to bring the exhaust tube P to a nearly vertical position, thereby to facilitate exhausting the lamp and preparing it for exhausting and tipping. The lamp may then be annealed at the same station or at a succeeding station constituting an annealing oven A' into which it may be passed. As shown, the station A' is a continuous extension of the station A, however it may be independent thereof.

It should be understood that the present disclosure is for the purpose of illustration only and that this invention includes all modifications and equivalents which fall within the scope of the appended claims.

We claim:

1. A machine for converting a partially manufactured straight lamp tube into a substantially circular lamp comprising supporting means for suspending the lamp from one end means for softening the lamp sufficiently so that elongation takes place due to its suspended weight, circular mold means engageable with the opposite end of the lamp, power operated means for effecting engagement of the mold means with said opposite end of the lamp and movement thereof in directions to wrap the lamp thereabout, a motor for supplying the power necessary to effect operation of said power operated means, means situated in a position to be contacted by elongation of the lamp and operable by a predetermined elongation of the lamp to initiate operation of said motor.

2. A machine for converting a partially manufactured straight lamp tube having clamp caps at its opposite ends into a substantially circular lamp wherein the ends are adjacent, comprising means for suspending the lamp from one end means for softening the lamp sufficiently so that elongation takes place due to its suspended weight, circular mold means situated at the opposite end of the lamp, clamping jaws carried by the mold means, power operated means for effecting operation of the mold means to engage the jaws with said opposite end of the lamp and to impart to the mold movement to wrap the lamp thereabout a motor for supplying the power necessary to effect operation of the power operated means, and a trigger means at said opposite end of the lamp movable by contact of said opposite end of the lamp therewith upon reaching a predetermined length to initiate operation of said motor.

3. A machine for converting a partially manufactured straight lamp tube into a substantially circular lamp wherein the ends are adjacent, comprising means for suspending the lamp from one end means for softening the lamp sufficiently so that elongation takes place due to its suspended weight, a mold member for engaging the opposite end of the lamp, power operated means for effecting movement of the mold in directions to wrap the lamp thereabout, a motor for supplying the power necessary to effect operation of said power operated means, a centering device situated at said opposite end of the lamp for engagement with its lower end, said centering device being in vertical registration with the lamp supporting means so as to maintain the lamp perfectly straight, said centering device being movable by contact of the lamp therewith through elongation of the latter as it softens to initiate operation of said motor.

4. A machine for converting a partially manufactured straight lamp tube having clamp caps at its opposite ends into a substantially circular lamp wherein the ends are adjacent, comprising means for suspending the lamp from its upper end when in a softened state so that its longitudinal axis is substantially vertical, circular mold means engageable with the clamp cap at the lower end of the lamp, said mold means being movable in translation and rotation, means for effecting translational movement of the mold means parallel to the longitudinal axis of the lamp, said means including a beam on one end of which the mold means is pivotally mounted, a cross head movable horizontally to and from the axis of the suspended lamp to which the other end of the beam is pivotally fastened, a lever movable angularly about a predetermined center, one end of said lever being pivotally fastened to the beam substantially midway between its ends, means for effecting angular movement of the lever and a flexible element having one end wrapped around the mold means and its other end fixed so that elevation of the beam simultaneously rotates the mold in a direction to bend the softened lamp around the mold.

5. A machine for converting a partially manufactured straight lamp tube having clamp caps at its opposite ends into a curved lamp, comprising means for suspending the lamp from its upper end while in a softened state so that its longitudinal axis is substantially vertical, mold means engageable with the clamp cap at the lower end of the lamp, means for guiding the mold means in a path parallel to the longitudinal axis of the lamp, said means including a beam on one end of which the mold means is pivotally mounted, a cross head, horizontal tracks supporting the cross head for movement to and from the axis of the suspended lamp, to which the other end of the beam is pivotally fastened, an elevating lever movable angularly about a predetermined center, one end of said lever being pivotally fastened to the beam substantially midway between its ends, angular movement of the elevating lever being operable to slide said other end of the beam rearwardly along the track and simultaneously rotate the beam in a counterclockwise direction about said other end, depress its one end and operable to slide said other end forwardly along the track and simultaneously rotate the beam in a clockwise direction about said other end to elevate said one end, means for effecting rotation of said lever and means for cushioning the movement of the beam in its counterclockwise movement.

6. A machine for converting a partially manufactured straight lamp tube having clamp caps at its opposite ends into a curved lamp, comprising support means for suspending the lamp from its upper end while in a softened state so that its longitudinal axis is substantially vertical, a mold means having clamps engageable with the clamp cap at the lower end of the lamp, means for guiding the mold means in a path parallel to the longitudinal axis of the lamp, said means including a beam on one end of which the mold means is pivotally mounted, means supporting the opposite end of the beam for pivotal movement and linear movement to and from the suspended lamp, an elevating lever pivoted for angular movement about its fixed center, one end of said elevating lever being pivotally connected to the beam substantially midway between its ends, a reversible motor for effecting angular movement of the elevating lever to raise and lower the beam, a piston and cylinder assembly, said piston having a rod connected to the beam, means for effecting operation of the motor in one direction to rock the elevating lever in a direction to raise the beam and in the other direction to lower the beam, means operable simultaneously with the operation of the motor to effect raising of the beam to admit a fluid pressure to the cylinder, to move the piston in a direction to assist in raising the beam, means to cut off the fluid pressure to the cylinder as the motor reverses its direction of rotation to lower the beam and a bleeder valve in the cylinder to permit the fluid pressure to leak out slowly.

7. A machine for converting partially manufactured straight lamp tubes into curved lamps, comprising an index head, radially extending arms on said head, a clamp near the end of each arm adapted to receive an end of a lamp to hold it suspended with its longitudinal axis substantially vertical, a two-part oven, the parts of which are separable in a vertical plane and which has an open top and bottom which are normally separated to receive between them a lamp while suspended on its arm, means for effecting intermittent rotation of the head to bring one arm and hence one lamp at a time into the open oven, means to close the oven about the lamp, mold means situated at the lower end of the oven having an annular groove, said mold means being movable vertically parallel to the axis of the lamp and being rotatable about a horizontal axis at right angles to the longitudinal axis of the lamp, clamp means on the mold means normally open when the oven is closed, a trigger directly below the lower end of the oven in a position to be depressed by the lamp upon elongation thereof due to softening, power operated means operable to open the oven raise the mold from below the oven to the level of the lower end of the lamp, close the clamps on the lower end, effect vertical and rotary movement of the mold to wrap the soft lamp about the mold, disengage the clamps from the lower end of the lamp when it is completely formed and effect movement of the completed lamp away from the oven while moving the next lamp on the index head into the oven a motor for effecting operation of the power operated means, operation of said motor being initiated by depression of the trigger, a motor circuit and means in the motor circuit for driving the motor at a low speed until the clamps reach the level of the lower end of the lamp and clamp it and for thereafter driving it at a high speed to wrap the lamp into the annular groove.

8. In an apparatus for bending glass tubes, an index head for holding the tubes suspended from one end, a heating unit for plasticizing the tubes preliminarily to bending, said index head being movable successively to bring tubes to the place of the heating unit, means for initially effecting movement of the index head to step it through a distance corresponding to the spacing of the tubes thereon to bring a tube to said place of heating, and other means operable by a predetermined elongation of the tube due to softening to continue rotation of the index head at intervals depending upon the time required to effect softening of the tubes in the heating unit.

9. In an apparatus for bending glass tubes, an index head for holding the tubes suspended from one end, a heating unit for plasticizing the tubes preliminarily to bending, said index head being movable successively to bring the tubes to the place of the heating unit, means for effecting movement of the index head initially to step the head a distance corresponding to the spacing of the tubes thereon to bring a tube to said place of heating, and other means operable by a predetermined elongation of the tube in the heating unit to continue rotation of the index head at intervals controlled by the time required to effect heating of the tube to said elongation, said other means being inoperative to effect rotation of the index head in the absence of a tube in the heating unit.

10. A method of bending glass tubing comprising heating the tube to soften its walls, cooling one side without spoiling its plasticity and then bending the tube so that the softer side forms the inside of the bend.

11. A method of bending a glass tube comprising the steps of heating the tube to soften its walls, cooling a portion of its walls at one side more than the other while maintaining the entire wall plastic, and then bending the tube into substantially circular form and in a direction so that the softer side forms the inside of the article so formed.

12. A method for bending a glass tube comprising the steps of subjecting the tube to a temperature sufficient to plasticize it as a whole, cooling a portion of its walls to make it less plastic along one side, and then bending the tube into substantially circular shape in such a direction that the side of lower plasticity is on the inside of the bend.

13. A method of bending a glass tube which comprises the steps of differentially plasticizing the tube to soften one side more than the other, and then bending the tube so that the softer side is on the inside of the bend.

14. A method of bending a glass tube which comprises the steps of heating the entire tube to plasticize it, cooling one side without reducing its plasticity to a point where it can not be bent, quickly wrapping the tube around a heated mold with the uncooled side in contact therewith to form an annulus and progressively increasing the pressure within the tube during the wrapping of the tube about the mold.

15. A method of bending a glass tube comprising the steps of suspending the tube from one end, heating the tube to plasticize its walls, playing a current of air on one side of the tube to make that side somewhat less plastic, and then bending the tube by moving its free end in such a direction that the less plastic side is on the inside of the bend.

16. A method of bending a glass tube comprising the steps of supporting and plasticizing the tube, playing a current of cooling media on one side of the tube to make it less plastic on that side, and then wrapping the plasticized tube about a circular mold member with the side of greater plasticity in contact with the curved surface of the mold.

17. A method of bending a glass tube comprising the steps of supporting and plasticizing the tube, playing a current of air on one side of the tube to make it less plastic on that side, and then wrapping the plasticized tube about a heated circular mold member with the side of greater plasticity in contact with the heated circular surface of the mold member.

18. A method of bending a glass tube comprising the steps of supporting and plasticizing the tube for bending it about a circular mold member and then playing a current of cooling media on the wall of the tube which will be exposed when it is wrapped about said mold and throughout the length thereof which shall extend around substantially the lower half of the mold member.

19. A machine for converting a partially manufactured straight lamp tube having clamp caps at its opposite ends into a curved lamp tube comprising supporting means for suspending the lamp from its upper end while in a softened state so that its longitudinal axis is substantially vertical, mold means having clamps engageable with the clamp cap at the lower end of the lamp, said mold means being movable from a position below the level of the lower end of the lamp vertically to near the upper end of the lamp, elevator means supporting the mold means for vertical movement of the mold means in a path parallel to the longitudinal axis of the lamp, said mold means having two parts mounted on the elevator for rotation about a horizontal axis and movable to and from each other, levers on the elevator connecting the mold parts and movable to bring the mold parts together, means for effecting vertical movement of the elevator from its lowermost position to the level of the lower end of the lamp, and from the lower end of the lamp to near the top of the lamp and back again to its lowermost position, cam bars holding the parts positively separated during the initial movement of the elevator from its lowermost position to the level of the bottom of the lamp, said cam bars terminating at said level, a fluid operated piston operably connected to the levers on the elevator for positively closing the mold parts, operation of said fluid operated piston being initiated as the elevator rises toward the lower end of the lamp, but being rendered ineffective until the cam bars are cleared, whereupon the mold parts close on the lower end of the lamp, means near the upper limit of movement of the elevator to render the fluid operated piston ineffective, and yieldable means connected to the levers for separating the mold parts when the fluid operated piston is rendered ineffective to release the base of the lamp and to hold the mold parts separated until the elevator returns to its initial position.

HOWARD C. SNOW.
EVERETT F. KELLEY.
SAMUEL S. SAYWARD.

REFERENCES CITED

The following references are of record in the file of this patent:

UNITED STATES PATENTS

| Number | Name | Date |
|---|---|---|
| 670,167 | Wood | Mar. 19, 1901 |
| 1,482,455 | Berry | Feb. 5, 1924 |
| 2,208,958 | Brown et al. | July 23, 1940 |
| 2,258,408 | Gozzoli | Oct. 7, 1941 |
| 2,270,152 | Themak | Jan. 13, 1942 |
| 2,494,872 | Greiner et al. | Jan. 17, 1950 |